United States Patent [19]

Abe et al.

[11] Patent Number: 5,301,385
[45] Date of Patent: Apr. 12, 1994

[54] ELECTRIC VACUUM CLEANER

[75] Inventors: Katsumi Abe; Takeshi Mine, both of Tokyo, Japan

[73] Assignee: U.S. Philips Corporation, New York, N.Y.

[21] Appl. No.: 976,104

[22] Filed: Nov. 13, 1992

[30] Foreign Application Priority Data

Dec. 10, 1991 [JP] Japan .................. 3-349984

[51] Int. Cl.$^5$ .............................. A47L 9/28
[52] U.S. Cl. .......................... 15/319; 15/339
[58] Field of Search .................... 15/319, 339

[56] References Cited

U.S. PATENT DOCUMENTS

| 4,601,082 | 7/1986 | Kurz | 15/319 |
| 4,654,924 | 4/1987 | Getz et al. | 15/319 |
| 4,955,103 | 9/1990 | Scott et al. | 15/319 |
| 5,023,973 | 6/1991 | Tsuchida et al. | 15/319 |
| 5,033,151 | 7/1991 | Kraft et al. | 15/319 |

FOREIGN PATENT DOCUMENTS

| 2-152420 | 8/1992 | Japan . |
| 9006076 | 6/1990 | World Int. Prop. O. . |

Primary Examiner—Chris K. Moore
Attorney, Agent, or Firm—Ernestine C. Bartlett

[57] ABSTRACT

An electric vacuum cleaner which has a plurality of indicating lamps $L_1$–$L_6$ for being lighted in steps to indicate the power levels of the motor which has simple construction at connecting parts of the pipes, and which, comprises a plurality of indicating lamps which are provided on the nozzle part to indicate the power levels of the motor in steps; a power-source providing leads which extends from the body to the nozzle part; a control circuit which controls the power of the motor; a light-emitting element which emits optical signals based on the power signal generated by the control circuit; an optical-signal passage which is provided through the extension pipe in order that the optical-signals travel straight; a light-detecting element which receives the optical signals travelled from the light-emitting element; and driving circuitry for driving a plurality of the indicating lamps based on the signals received at the light-detecting element, is constructed in such a way that the power levels of the motor are converted into the optical signal at the light-emitting element (30) and then transmitted to the light-detecting element (40) through the light-signal passage (50), therefore electric pins for transmitting the output signals, which were conventionally required at the connecting part of the pipes, are now completely unnecessary.

3 Claims, 3 Drawing Sheets

| INDICATION OUTPUT TERMINAL | EDGE | DATA CODE | $L_1$ | $L_2$ | $L_3$ | $L_4$ | $L_5$ | $L_6$ |
|---|---|---|---|---|---|---|---|---|
| 1 | ⌐_ | 0 0 0 0 | ○ | — | — | — | — | — |
| 2 | " | 0 0 0 1 | ○ | ○ | — | — | — | — |
| 3 | " | 0 0 1 0 | ○ | ○ | ○ | — | — | — |
| 4 | " | 0 0 1 1 | ○ | ○ | ○ | ○ | — | — |
| 5 | " | 0 1 0 0 | ○ | ○ | ○ | ○ | ○ | — |
| 6 | " | 0 1 0 1 | ○ | ○ | ○ | ○ | ○ | ○ |
| 6 | ¬_ | 0 1 1 0 | ○ | ○ | ○ | ○ | ○ | ○ |
| 5 | " | 0 1 1 1 | ○ | ○ | ○ | ○ | — | — |
| 4 | " | 1 0 0 0 | ○ | ○ | ○ | — | — | — |
| 3 | " | 1 0 0 1 | ○ | ○ | — | — | — | — |
| 2 | " | 1 0 1 0 | ○ | — | — | — | — | — |
| 1 | " | 1 0 1 1 | — | — | — | — | — | — |

ELECTRIC VACUUM CLEANER

FIELD OF THE INVENTION

The invention relates to an electric vacuum cleaner comprising a body incorporating a motor, a control circuit for controlling the power of the motor, a plurality of indicating lamps for indicating the power of the motor in steps, a hose part which is connected to the body, a grip part which is connected to the hose part and is provided with a grip connecting part, an extension pipe connected to the grip connecting part, and a nozzle part with a nozzle pipe connected to the extension pipe.

BACKGROUND OF THE INVENTION

A vacuum cleaner of the kind mentioned in the opening paragraph is known from DE 29 23 588 A1. The known vacuum cleaner comprises a number of indicating lamps which are provided on its body. In this known vacuum cleaner, the power of the motor is controlled by a control circuit and the power levels of the motor thus controlled are indicated by the number of illuminated indicating lamps.

When the user actually uses the vacuum cleaner, he naturally looks at the floor surface to be cleaned. In other words, he looks around the nozzle on the floor which is located in front of him. However, if the indicating lamps are mounted on the body, the user must look back at every time when he wants to check the power levels of the motor, because the body is located behind him during cleaning.

SUMMARY OF THE INVENTION

An object of the invention is to provide an electric vacuum cleaner of the kind mentioned in the opening paragraph, which is more convenient to use.

The invention is for this purpose characterized in that the indicating lamps are provided on the nozzle part. As the indicating lamps are provided on the nozzle, the user can clean the floor, looking at the indicating lamps, without need to look back, to check the output levels of the motor which are changed gradually.

It is noted that PCT International Publication No. WO 90/06076 discloses a vacuum cleaner of a kind in which a nozzle part is constructed integrally with a body and in which indicating lamps are provided on the nozzle part. However, this vacuum cleaner of an integral body/nozzle-part is of a different kind than the vacuum cleaner mentioned in the opening paragraph. Furthermore, the indicating lamps of this vacuum cleaner do not indicate the power of the motor in steps.

A special embodiment of a vacuum cleaner according to the invention, which provides a simple construction at connecting parts of each construction member, is characterized in that the vacuum cleaner comprises a light emitting element for converting a power signal generated by the control circuit into an optical signal, that the extension pipe is provided with an optical signal passage for said optical signal, and that the nozzle part is provided with a light detecting element for receiving said optical signal and a driving means for driving the indicating lamps as a function of the optical signal received by the light detecting element. By using said optical signal passage, said light emitting element and said light detecting element, there is no need to provide electric pins at every connection part for signal supplying wires to be electrically connected, so that the construction of the connection parts becomes simple.

A further embodiment of a vacuum cleaner according to the invention is characterized in that the vacuum cleaner comprises converting means for converting the power signal generated by the control circuit into digital signals.

A yet further embodiment of a vacuum cleaner according to the invention is characterized in that floor condition detecting means are provided in the nozzle part, two couples of the light emitting element and the light detecting element being provided at both ends of the optical signal passage for supplying detecting signals generated by the floor condition detecting means to the control circuit.

BRIEF DESCRIPTION OF THE DRAWINGS

The vacuum cleaner according to the invention is explained in more detail based on the drawings, in which.

DETAILED DESCRIPTION OF THE PREFERRED EMBODIMENTS

Figure 2:
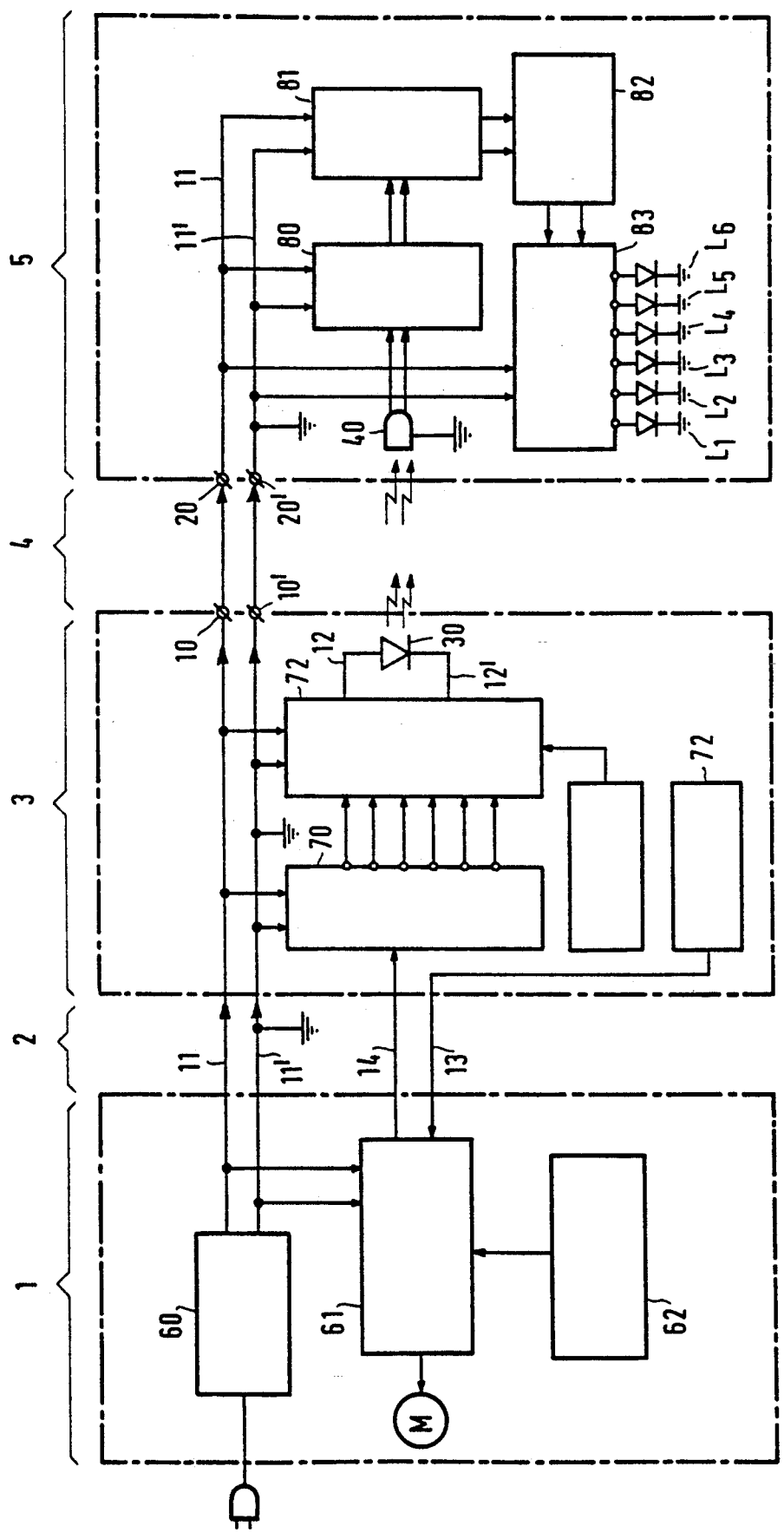
FIG. 2 shows the circuitry diagram of the vacuum cleaner according to the invention.
Figures 3, 4:
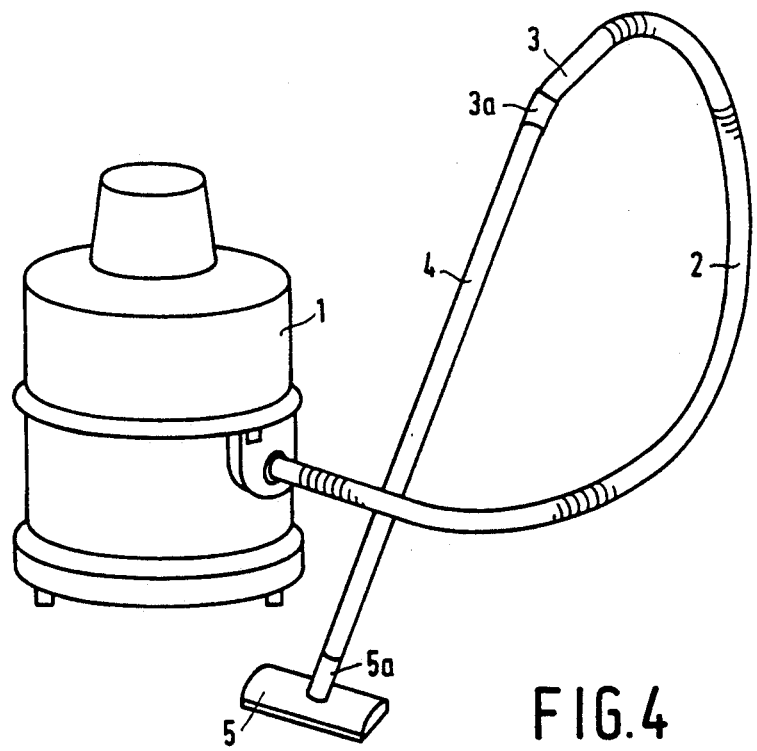
FIG. 3 shows a diagram showing the relation between the output signal of the indication output terminal, the data code and illumination status of the lamps.
FIG. 4 shows an electric vacuum cleaner according to the invention.

As shown in FIG. 2 and 4, the vacuum cleaner according to the invention basically consists of a body 1, a hose part 2, a grip part 3, an extension pipe 4 and a nozzle part 5. The body 1 is provided with floor-condition detecting means 62 comprising a pressure sensor for detecting the floor condition (whether it is a tatami mat or a carpet, how much dust exist, etc.), a power-source circuit 60 and a sucking-quantity control circuit 61 which controls outputs of a motor M in accordance with outputs of the floor-condition detecting means 62. At the grip part 3 there are provided an indication output circuit 70, an oscillation-code selector 71, a light-emitting element 30 which emits a data code as an infrared signal and an operating part 72 which turns a switch of the vacuum cleaner on and off. At the nozzle part 5, there are provided a light-detecting element 40 which receives said infrared signal and convert it into an electric signal, an amplifying part 81 which amplifies a motor output signal which is now converted into the electric signal, a decoder 80 which reproduces the data code of the motor output signal, a holding circuit which stores thus reproduced data code, a holding circuit 82 which stores the reproduced data code and a lamp-driving circuit 83 which drives a plurality of indicating lamps $L_1$–$L_6$ in accordance with the signal supplied by the holding circuit 82.

Figure 1:
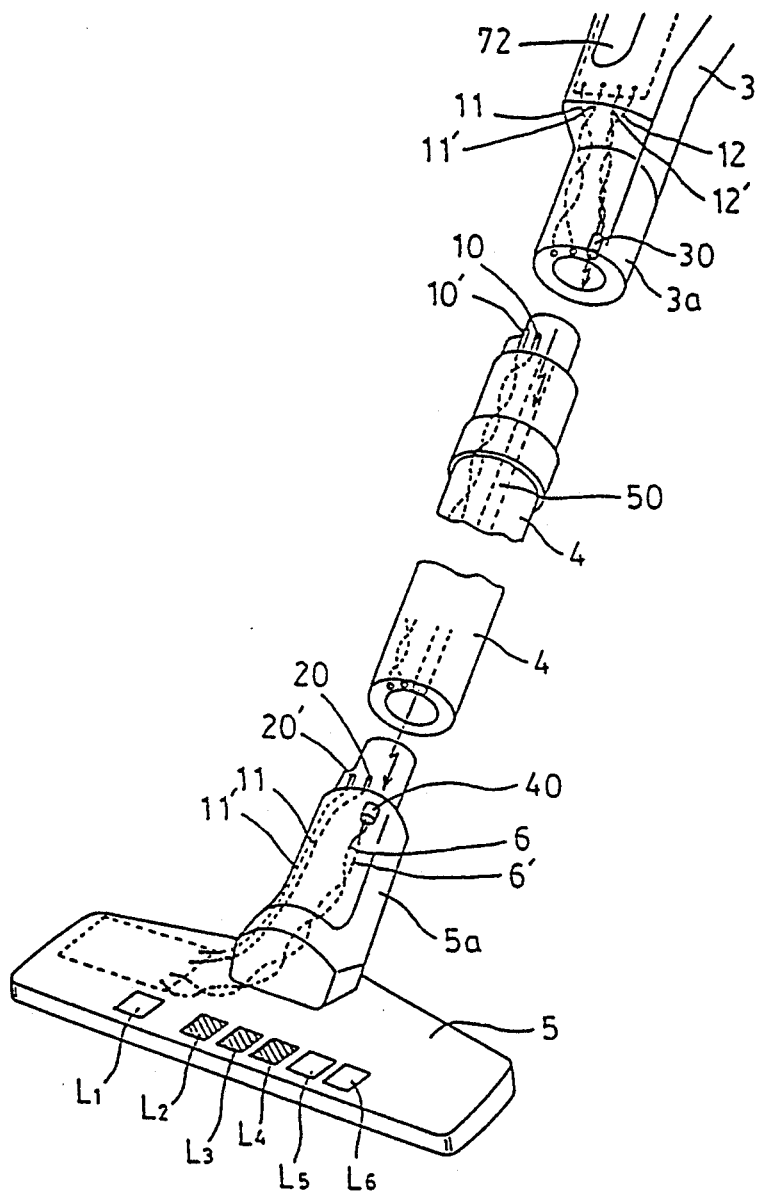
FIG. 1 shows partially the respective connection parts between the grip part and extension part, the extension part and the nozzle part of the vacuum cleaner according to the invention.

Two power-source supplying wires 11, 11' are wired from the power-source circuit 60 to the nozzle part 5 through the hose part 2, the grip part 3 and the extension pipe 4, by which wires the power voltage is supplied to the sucking-quantity control circuit 61, the indication output circuit 70, the oscillation-code selector 71, the amplifying part 80, the decoder 81, the holding circuit 82 and the lamp-driving circuit 83. As shown in FIG. 1, at the connection part between the grip-connecting part 3a and the extension pipe 4 the power-source supplying wire 11, 11' are electrically connected via two electric pins 10, 10' which are mounted on an end face of the extension pipe 4. Similarly, at the connection part between the extension pipe 4 and the nozzle-side pipe 5a the power-source supplying wires 11, 11' can be electrically connected via two electric pins 20, 20' which are mounted on an end face of the nozzle-side pipe 5a. Further, a switch-on signal from the operating part 72 is supplied to the sucking quantity control circuit 60, for instance, through a first analog-signal supplying wire 13. Then the motor output signal is supplied from the sucking-quantity control circuit 60 to the indication output circuit 70, for instance, through a second analog-signal supplying wire 14. The output signal of the oscillation-code selector 71 is supplied to the light-emitting element 30 through two signal-supplying wires 12, 12'. Throughout the wall of the extension pipe 4, there is provided a light-signal passage 50 in such a way that an infrared light emitted by the light-emitting element 30 can travel straight.

The motor output signal is firstly supplied as an analog signal from the body 1 to the hose part 2 (see FIG. 2) through the first analog-signal supplying wire 14. Then the analog signal is converted into a digital signal and supplied to the light-emitting element 30, which is mounted on one end face of the grip-part connecting part 3a, through two signal-supplying wire 12, 12'. The light-emitting element 30 converts the motor output signal into a pulse-modulated infrared signal. The infrared signal is supplied to a light-detecting element 40, which is mounted on one end face of the nozzle-side pipe 5a through the light passage 50 of the extension pipe 4. Said motor output signal is then converted into an electric signal by the light-detecting element 40, which is supplied to the lamp-driving circuit 83 through the amplifier part 80, the decoder 81 and the holding circuit 82 (see FIG. 2) to illuminate the indicating lamps $L_1$–$L_6$.

FIG. 3 shows that the six indicating lamps $L_1$–$L_6$ arranged in line are illuminated in twelve ways according to the combination of indication outputs (start/end) 1-6 which are selected in accordance with the motor output signal and pulse codes which consist of 4 bits and correspond to the indication output. In the diagram, "0" means the indicating lamp turned on and "—" means the indicating lamp turned off.

For example, when the floor-conditions detecting means 62 mounted in the body detect a high suction pressure, the sucking-quantity control circuit 61 gradually changes the output of the motor M from the minimum value to the maximum value. At that time, the indication output circuit 70 determines which indication output terminal should be energized in accordance with the output signal of the sucking-quantity control circuit 61. The signal is supplied to the oscillation-code selector 71, which selects the data code corresponding to the indication output terminal. As shown in the top line of the diagram in FIG. 3, if a threshold voltage is generated at the indication output terminal 1 of the indication output circuit 70, a pulsed data code "0000" is supplied from the oscillation code selector 71 to the light-emitting element 30. Then the data code "0000" is supplied to the light-detecting element 40 as an infrared signal. The signal converted into an electric signal at the light-detecting element 40 is amplified at the amplifier part 80 and the data code is reproduced by the decoder 81. The thus reproduced data code is once stored in the holding circuit 82 and then supplied to the lamp-driving circuit 83. At that time, the data code is "0000", therefore only the indicating lamp $L_1$ is illuminated. Next, when a rising edge signal is generated at the indication output terminal 2 of the indication output circuit 70, a data code "0001" is supplied to the lamp-driving circuit 83 in the same way as before and two lamps $L_1$ and $L_2$ are illuminated. When the output of the motor M reaches the maximum value, the threshold voltages are serially supplied to the indication output terminal 6 and finally a data code "0101" is supplied to the light-detecting element 40 to illuminate the whole six lamps $L_1$–$L_6$. Similarly, the lamps $L_1$–$L_6$ are serially turned off in accordance with the data codes as the transition edge signals are supplied.

The above mentioned embodiment refers to the floor-conditions detecting means which detects the floor conditions by a degree of vacuum in the vacuum cleaner body to control the motor output by detecting signals. However, other embodiment of the floor-conditions detecting means explained is also acceptable. For example, an optical sensor may be provided in the body to detect dust quantity according to the amount of light transmitted. Beside this, an optical sensor may be provided in a roller mounted in the nozzle to detect dust quantity by counting the number of the roller rotation and by measuring the length of the stroke.

On the other hand, for example, a dust sensor having pins which detect the dust quantity on the floor directly may be provided in the nozzle part instead of in the vacuum cleaner body, whereby the motor output according to the dust quantity detected by the dust sensor can be controlled. In that case, two couples of the light-emitting element and the light-detecting element are respectively provided at each one end of the nozzle-side pipe and the grip-part connection part of the predescribed vacuum cleaner in order to enable the optical signal to travel in two-way. Then, the signal generated from the dust sensor mounted in the nozzle can be supplied from the nozzle part to the body through the extension pipe, the grip part and the hose part. And in return, the motor output signal generated in accordance with said motor output signal is supplied to a plurality of lamps mounted on the nozzle part to illuminate them in the same way as described in the first embodiment.

According to the vacuum cleaner according to the invention, the following advantages can be obtained.

(1) There is no need to arrange the wires for supplying signals through the pipe besides a light-signal passage throughout the wall of the extension pipe. That is, as there is no need to provide electric pins at every connection part for the signal supplying wires to be electrically connected, the construction of the connection parts between the detachable members becomes simple which results in the low production cost of the vacuum cleaner.

(2) As the indicating lamps are provided on the nozzle, the user can clean the floor, looking at the indicating lamps, without need to look back, to check the output levels of the motor which are changed gradually. With many lamps illuminated, the user can easily find the abnormal situation like that the nozzle part is too much pressed to the floor, or much dust are still remained on the floor or some object jams in the hose part.

We claim:

1. An electric vacuum cleaner comprising a body incorporating a motor, a control circuit for controlling the power of the motor, a plurality of indicating lamps for indicating the power of the motor in steps, a hose part which is connected to the body, a grip part which is connected to the hose part and is provided with a grip connecting part, an extension pipe connected to the grip connecting part, and a nozzle part with a nozzle pipe connected to the extension pipe, wherein: the indicating lamps are provided on the nozzle part, the vacuum cleaner also comprising a light emitting element for converting a power signal generated into an optical signal, and wherein the extension pipe is provided with an optical signal passage for said optical signal, the nozzle part is provided with a light detecting element for receiving said optical signal and a driving means for driving the indicating lamps as a function of the optical signal received by the light detecting element is provided.

2. An electric vacuum cleaner as claimed in claim 1, characterized in that the vacuum cleaner comprises converting means for converting the power signal generated by the control circuit into digital signals.

3. An electric vacuum cleaner as claimed in claim 1, characterized in that floor condition detecting means are provided in the nozzle part, two couples of the light emitting element and the light detecting element being provided at both ends of the optical signal passage for supplying detecting signals generated by the floor condition detecting means to the control circuit.

* * * * *